(12) United States Patent
Backlund

(10) Patent No.: US 7,934,153 B2
(45) Date of Patent: Apr. 26, 2011

(54) VISUAL DOCUMENT STRUCTURE INDICATOR SYSTEM

(75) Inventor: Bjorn Eric Pekka Backlund, La Jolla, CA (US)

(73) Assignee: MadCap Software, Inc., La Jolla, CA (US)

( * ) Notice: Subject to any disclaimer, the term of this patent is extended or adjusted under 35 U.S.C. 154(b) by 1025 days.

(21) Appl. No.: 11/429,539

(22) Filed: May 5, 2006

(65) Prior Publication Data
US 2006/0250420 A1    Nov. 9, 2006

Related U.S. Application Data

(60) Provisional application No. 60/678,605, filed on May 6, 2005, provisional application No. 60/678,513, filed on May 6, 2005.

(51) Int. Cl.
*G06F 17/00* (2006.01)
(52) U.S. Cl. ........ 715/234; 715/255; 715/760; 715/792; 715/853
(58) Field of Classification Search .................. 715/234, 715/255, 760, 792, 853
See application file for complete search history.

(56) References Cited

U.S. PATENT DOCUMENTS

| | | | | |
|---|---|---|---|---|
| 6,851,089 B1* | 2/2005 | Erickson et al. | ............... | 715/255 |
| 2002/0156813 A1* | 10/2002 | Gardner | ........................ | 707/513 |
| 2002/0184264 A1* | 12/2002 | Berg et al. | ..................... | 707/513 |
| 2003/0034989 A1* | 2/2003 | Kondo | .......................... | 345/630 |
| 2003/0237046 A1* | 12/2003 | Parker et al. | ................... | 715/513 |
| 2005/0198617 A1* | 9/2005 | Kim et al. | ....................... | 717/109 |
| 2005/0248790 A1* | 11/2005 | Ornstein et al. | ............. | 358/1.12 |
| 2006/0168562 A1* | 7/2006 | Emek et al. | ..................... | 717/110 |
| 2006/0174187 A1* | 8/2006 | White et al. | ............... | 715/501.1 |
| 2008/0098293 A1* | 4/2008 | Clarke et al. | .................. | 715/229 |
| 2009/0024937 A1* | 1/2009 | Lauff et al. | ..................... | 715/762 |
| 2009/0137202 A1* | 5/2009 | Fujimaki et al. | ............. | 455/3.01 |

OTHER PUBLICATIONS

Microsoft Script Editor Help, Microsoft Office 2003, mse7.chm, "Visual Studio Reference" May 7, 2003.*
Microsoft Script Editor, (C) 2001 Screenshotstaken Jul. 15, 2010.*
Shank , David , Tamra Myers and Mark Roberts, Microsoft Office 2000/Visual Basic Programmer's Guide, Microsoft Press, May 1, 1999, "Working with Command Bar Controls" http://msdn.microsoft.com/en-us/library/aa141695(office.10,printer).aspx.*

* cited by examiner

*Primary Examiner* — Adam M Queler
(74) *Attorney, Agent, or Firm* — Procopio, Cory, Hargreaves & Savitch LLP

(57) ABSTRACT

Systems and methods for represent and manipulate (i.e., processing) the underlying structure of a structured document (e.g., a mark-up language document), while maintaining a What You See Is What You Get (WYSIWYG) environment. The traditional WYSIWYG editor view is paired with a Visual Document Structure Indicator (VDSI) pane to allow for both WYSIWYG and structure editing within a single interface. The VDSI pane includes left pane and upper pane, which are configured along the left and top borders, respectively. The document editor allows document content to be created, edited, and maintained in the WYSIWYG environment while keeping document structure information available to the user.

22 Claims, 17 Drawing Sheets

<p> a b c <b> d e f </b> <u> g h i </u> </p>

VISUAL DOCUMENT STRUCTURE INDICATOR SYSTEM

CROSS-REFERENCE TO RELATED APPLICATIONS

This application claims the benefits of priority of U.S. Provisional Patent Application Ser. No. 60/678,605, filed May 6, 2005, entitled "Visual Document Structure Indicator", and U.S. Provisional Patent Application Ser. No. 60/678,513, filed May 6, 2005, entitled "Directional I-Beam Cursor". The disclosures of the above-referenced patent applications are hereby incorporated by reference.

FIELD OF THE INVENTION

The present invention relates generally to representing and manipulating the underlying structure in a structured document, and more specifically, to providing an integrated document editor that allows document content to be created, edited, and maintained in a traditional editor environment while providing access to document structure information.

RELATED ART

Documents may generally be categorized as being either structured or unstructured. Unstructured documents represent the contents of the documents as a linear sequence of characters. These characters include the content of the document as well as control characters that specify formatting information regarding the document. A structured document, in contrast, is not ordered as a linear representation but typically is organized as a tree structure or other type of directed acyclic graph. For example, a document may be represented as a tree with a document node at the top having child nodes representing the front and back portions of the document, which may include sections and paragraphs. These components are organized as a hierarchical tree. Each structured document may be specified in a structured document language, such as the extensible markup language (XML) or the Standard Generalized Mark-up Language (SGML), or may be specified according to a known standard, such as the Office Document Architecture (ODA) standard.

For users, the editing of unstructured documents is fairly intuitive and straightforward. The user simply selects a portion of the document to be edited and then applies an editing operation to the selected portion. With structured documents, editing is not as straightforward. Structured document editors require that the user operate on the syntactic entities (e.g. section, paragraph, etc.) specified within the structured document. As a result, editing operations may be cumbersome. Accordingly, it may not be possible to edit a portion of the document, which spans the boundaries of syntactic entities, in a single operation Current editors for writing with structured markup languages, such as XML and SGML, focus primarily on either document structure (at the expense of content editing) or focus on content editing (and abstract away the underlying structure).

SUMMARY

Embodiments of the invention include systems and methods for representing and manipulating (i.e., processing) the underlying structure of a structured document (e.g., a markup language document), while maintaining a What You See Is What You Get (WYSIWYG) environment. In one aspect, the traditional WYSIWYG editor view is paired with a Visual Document Structure Indicator (VDSI) pane to allow for both WYSIWYG and structure editing within a single interface. The VDSI pane can include a left pane and an upper pane, which are configured along the left and top borders of the display, respectively.

In one embodiment a system for processing a structured document includes a user interface configured to receive user input and a document data storage configured to receive and store document data from the structured document. The system further includes a data manipulator configured to receive the document data and the user input, and operating to manipulate the received document data according to the user input, and to store the manipulated document data in said document data storage. The system also includes a data display unit configured to receive and process at least one of the user input and the document data. The data display unit operates to display different components of the processed document data in separate areas of a display pane. The data display unit includes: a content display unit configured to display the content of the document data in a format appropriate for processing the content, said content display unit operating to display the content of the document data in a first area of the display pane; and a structure display unit configured to display the underlying structure of the document data in a graphical format appropriate for processing the underlying structure, said structure display unit operating to display the underlying structure of the document data in a second area of the display pane separate from the first area.

In another embodiment, a method for processing a structured document includes manipulating and storing document data from the structured document according to user input; and processing the document data to display different components of the processed document data in separate areas of a display pane. The method also includes displaying content of the document data in a first area of the display pane, in a format appropriate for processing the content; and displaying an underlying structure of the document data in a second area of the display pane separate from the first area, in a graphical format appropriate for processing the underlying structure.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Embodiments described herein provide systems and methods for representing and manipulating (i.e., processing) the underlying structure of a structured document (e.g., a mark-up language document), while maintaining a What You See Is What You Get (WYSIWYG) environment. In one embodiment, the traditional WYSIWYG editor view is paired with a Visual Document Structure Indicator (VDSI) pane to allow for both WYSIWYG and structure editing within a single interface (see FIG. 2). In this embodiment, the VDSI pane includes left pane and upper pane, which are configured along the left and top borders, respectively. Thus, this embodiment provides a document editor that allows document content to be created, edited, and maintained in the WYSIWYG environment while keeping document structure information available to the user.

Figure 1A:
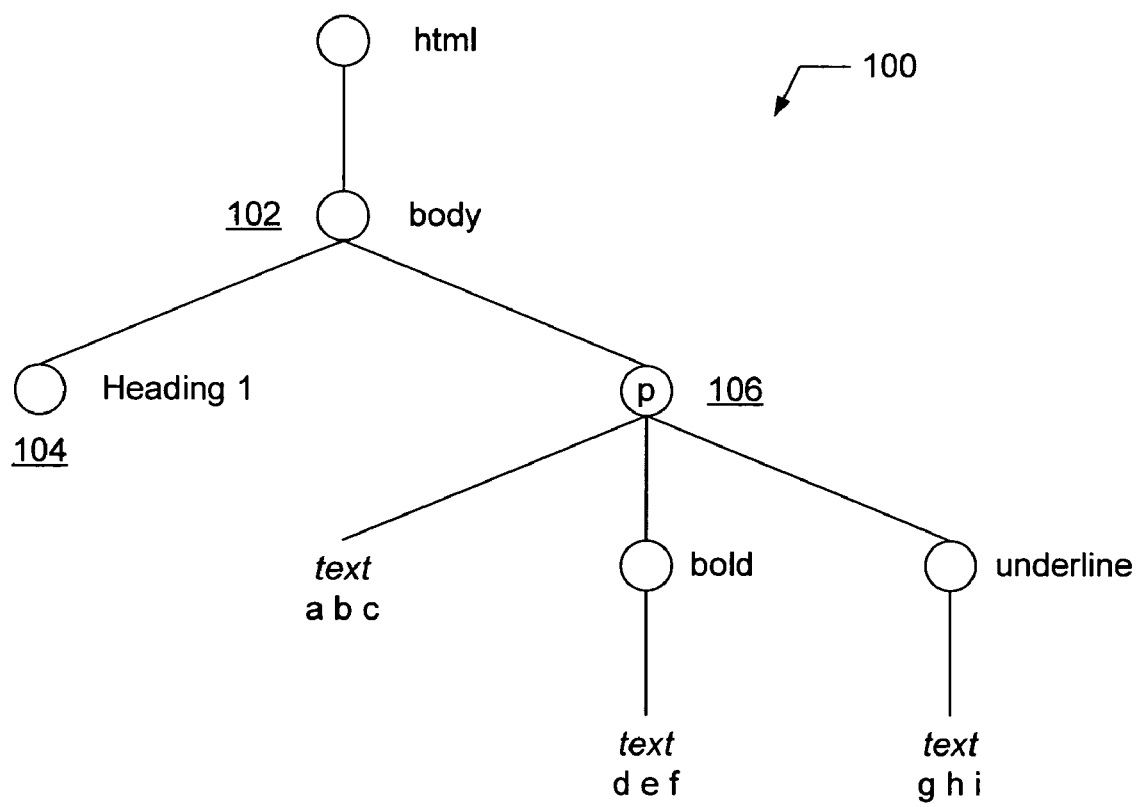
FIG. 1A is a graphical representation of a relatively simple structured document represented in a tree format according to one embodiment.

FIG. 1A is a graphical representation of a relatively simple structured document represented in a tree format 100. In the illustrated example, the structured document is an Extensible HyperText Markup Language (XHTML) document. The body 102 of the document includes a heading 104 and a single paragraph 106 represented by 'p'. The paragraph 106 includes plain text 'abc' followed by bold text 'def' followed by underlined text 'ghi'. When this document is displayed, the display software traverses the tree 100 in the order from top to bottom and left to right. Therefore, the execution of this document would be displayed as 'abcdefghi'.

One aspect of the VDSI system is that the system is not only a visual representation of the underlying structure of the document, but also provides for element level modification of the document at this structure level. Thus, the use of the VDSI pane provides a single editor with the benefits of both a WYSIWYG editing environment and a structure-based editing environment through a single interface.

Figure 1B:
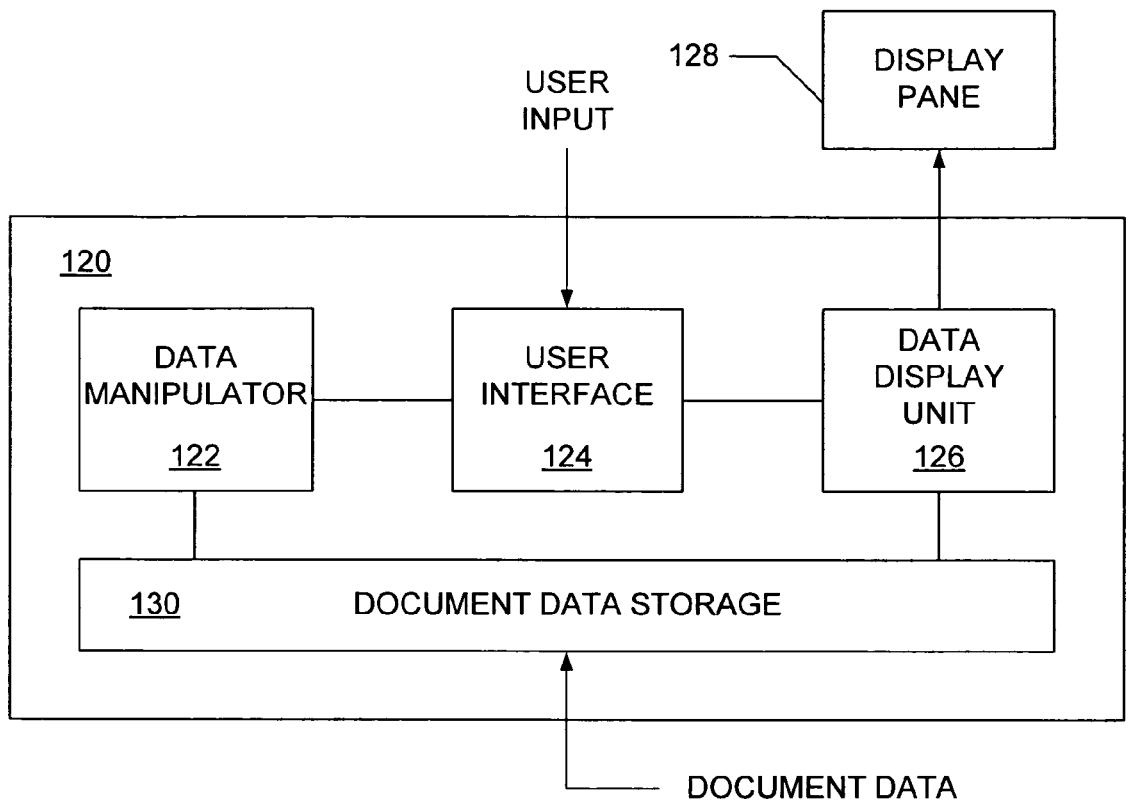
FIG. 1B is a block diagram of a data processing system which can process a document such as the structured document shown in FIG. 1A.

FIG. 1B is a functional block diagram of a data processing system 120 which can process a document such as the structured document 100 shown in FIG. 1A. In the illustrated embodiment of FIG. 1B, the data processing system 120 includes a data manipulator 122, a user interface 124, and a data display unit 126.

The user interface 124 receives the input from the user and sends the input either to the data display unit 126 to be processed and displayed and/or to the data manipulator 122 to manipulate the data. The user input can be a command, content (e.g., text), or other related input. The data manipulator 122 receives document data (e.g., data from document 100), which may include text content, document structure data, and other related data such as metadata, from a document data storage 130, and manipulates the received document data according to the user input. The manipulated document data is then stored in the document data storage 130. The data display unit 126 receives the user input from the user interface 124 and the document data from the storage 130, and processes the user input and the document data to generate a visual representation of the document data. The data display unit 126 displays various components of the processed user input and the document data on a display pane 128 in a manner which will be described in more detail below.

Figure 1C:
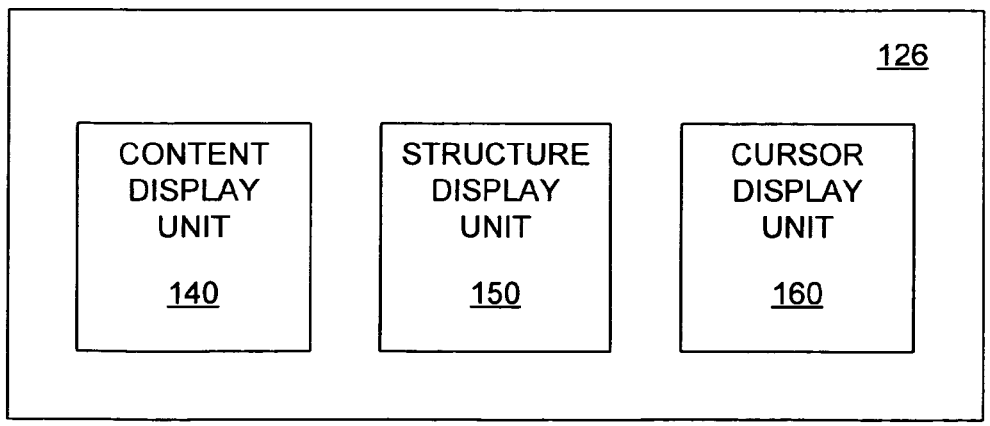
FIG. 1C is a detailed block diagram of a data display unit shown in FIG. 1B.

As illustrated in FIG. 1C, for example, the data display unit 126 includes a content display unit 140, a structure display unit 150, and a cursor display unit 160. In one embodiment, the content display unit 140 analyzes and displays the text content of the document data; the structure display unit 150 analyzes and displays information representation of the structure of the document data; and the cursor display unit 160 displays the configuration of the cursor that indicates the current location of text content processing. In examples described below, the structure display unit 150 displays the different components of the structure in separate areas of the display pane. The operation of the data processing unit 120, and in particular, the operation of the data display unit 126 and its associated units with respect to the display pane 128, is described below in detail in connection with FIGS. 2-15. Though the operation is described with reference to what is displayed to a user, it is to be understood that the display is generated by the units of the data processing system responding to user input and document data.

Figure 2:
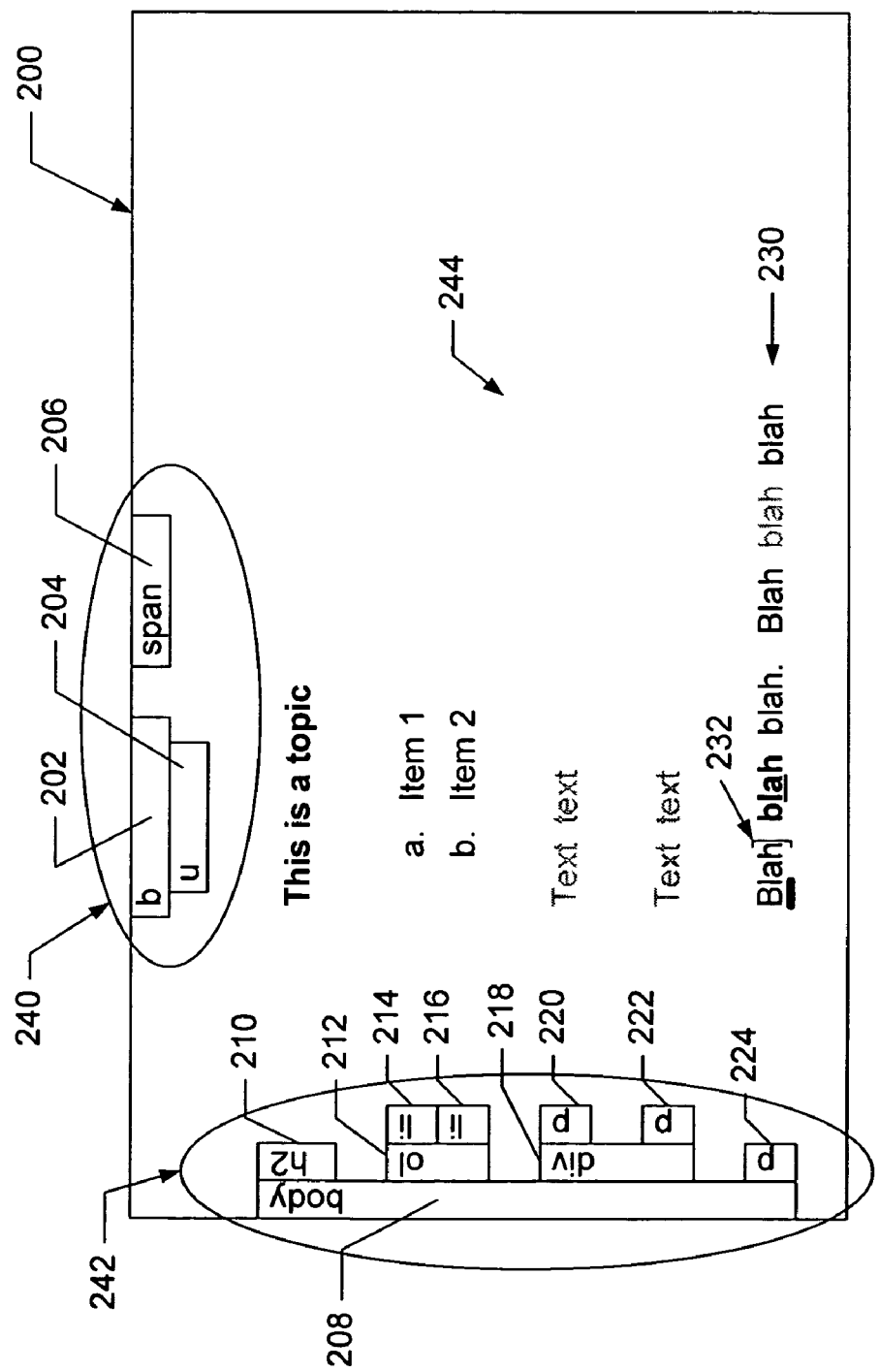
FIG. 2 illustrates a Visual Document Structure Indicator (VDSI) pane configured with an upper pane along the top border and a left pane along the left border.

FIG. 2 illustrates a VDSI pane 200 configured with an upper pane 240 along the top border and a left pane 242 along the left border. In the illustrated example, the upper pane 240 graphically displays in-line elements (e.g., mark-up elements) associated with current block 230 where the cursor 232 is located. The left pane 242 indicates the blocks being displayed in the center portion 244 (i.e. the body of the display represented by element 208).

In the illustrated example of FIG. 2, the upper pane 240 indicates that the current block 230 includes bold represented by element 202 and that within the bold section of the block 230 there is underlining represented by element 204. The upper pane 240 also indicates that there is a span indicated by element 206. The span identifies the section of colored text 234 to the right in that last line 230. When the cursor 232 is moved to a different block, for example, the paragraph located directly above the last paragraph 230, the display in the upper pane 240 would then represent the in-line elements of that block.

The left pane 242 of the VDSI pane 200 indicates the blocks being displayed in the center portion 244 of the display represented by element 208. For ease of display, the top level node is not displayed. In the left pane 242, the body of the document is represented by element 208, the heading block is represented by element 210, the ordered list is represented by element 212, and the ordered list includes two entries represented by elements 214 and 216. A division is represented by block 218 and includes two paragraphs represented by elements 220 and 222. A final block/paragraph is represented by element 224. In the illustrated example, the final paragraph 224 is highlighted in the display to indicate that this is the block in which the cursor 232 is currently active. Similarly, the in-line element in which the cursor 232 is currently active would also be highlighted. As further described in more detail below, a WYSIWYG display of the document in section 244 is present and can be edited while the underlying structure of the document is both visible (as upper and left panes) and can be directly manipulated and edited.

Figure 3:
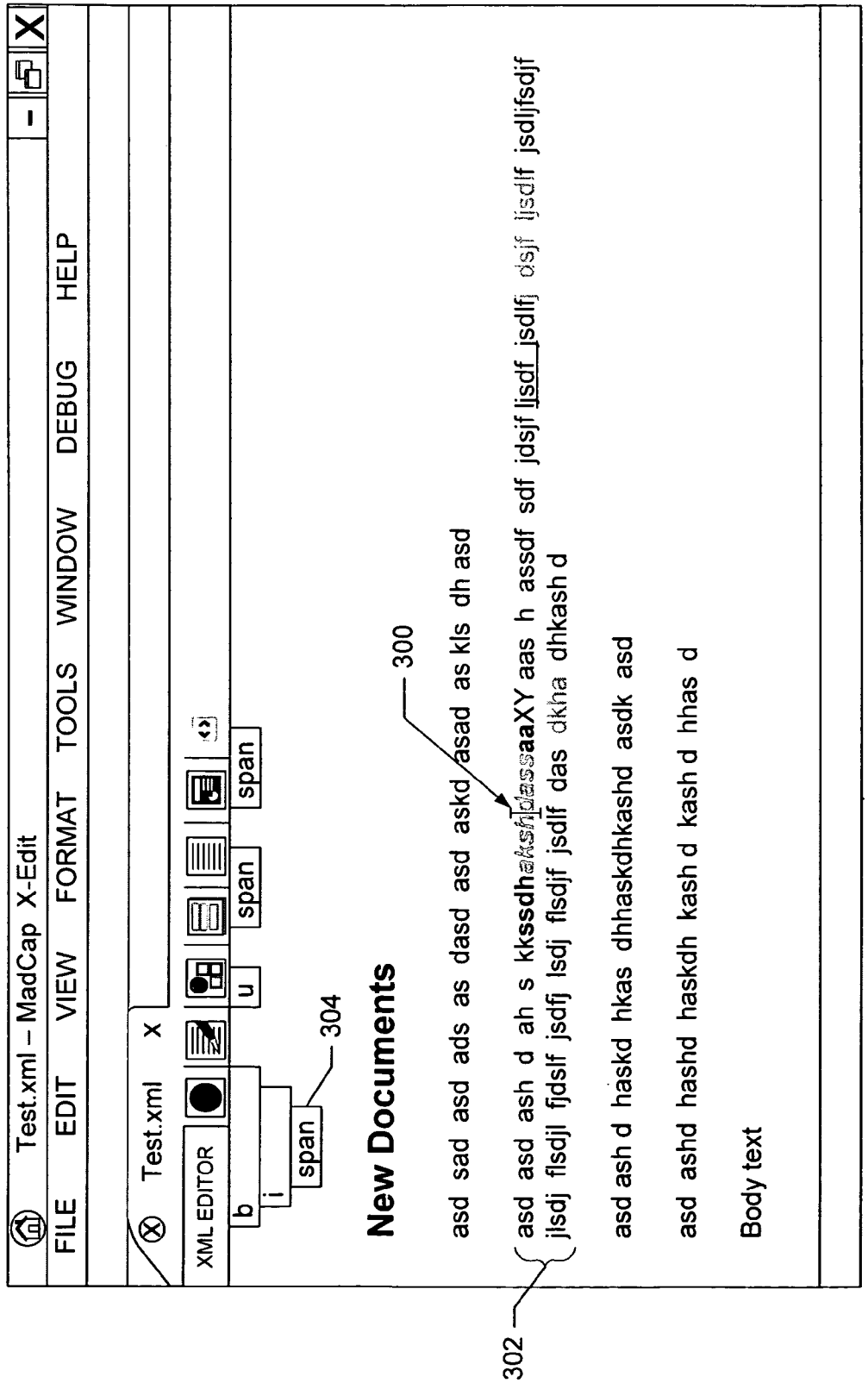
FIG. 3 illustrates another example of a VDSI pane configured with an upper pane along the top border.

Referring now to another example shown in FIG. 3, the upper pane indicates that within the block 302 in which the cursor 300 is currently active there are in-line elements of bold, italics, span (color), underline, and two more spans. The span 304 within the italics is highlighted to indicate that the cursor 300 is presently within that element 304. For ease of display, the side pane is not displayed in the view shown in FIG. 3.

Figure 4:
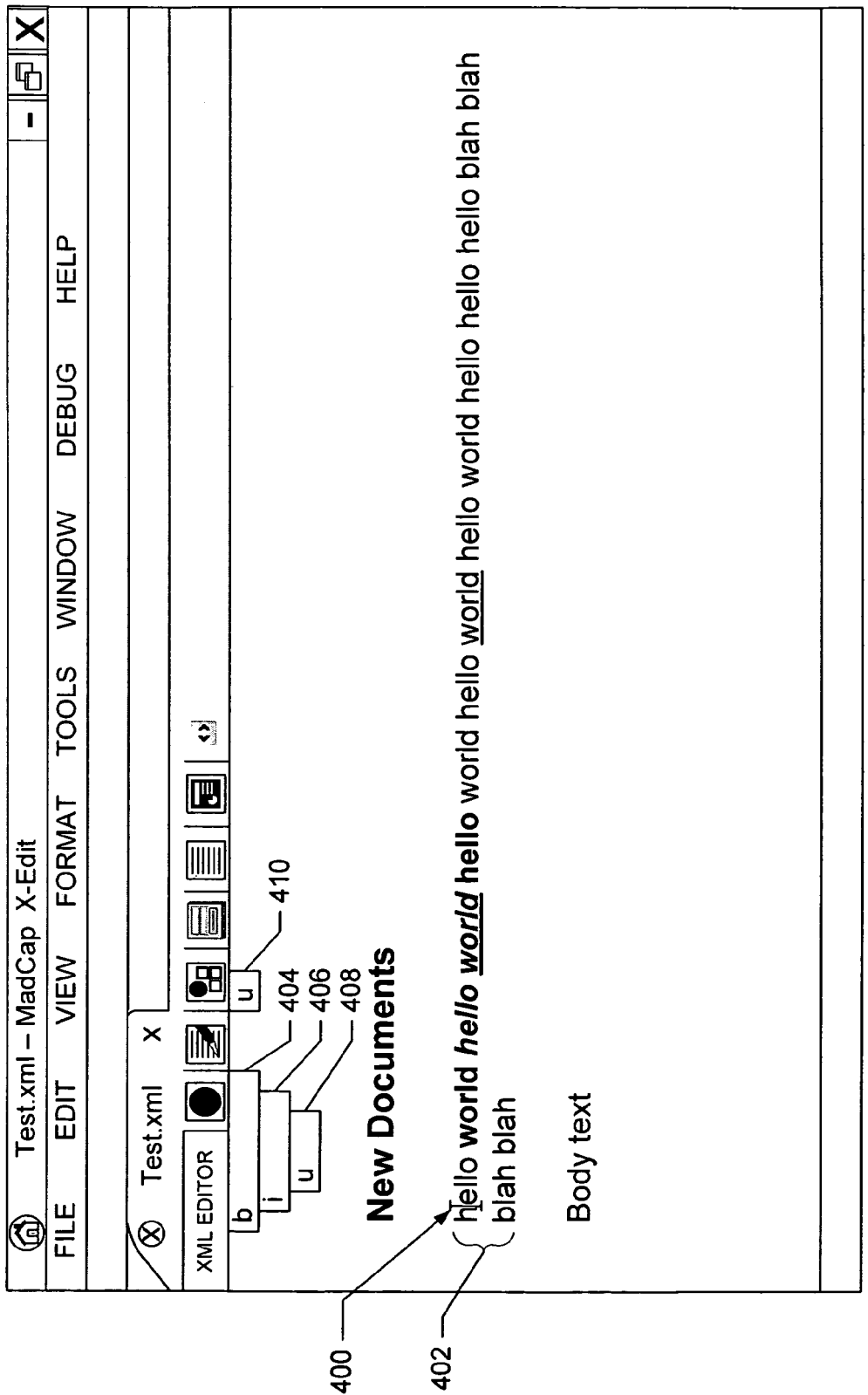
FIG. 4 illustrates another example configuration similar to the configuration shown in FIG. 3.

FIG. 4 illustrates another example configuration similar to the configuration shown in FIG. 3. The upper pane indicates that the current block 402 includes bold 404, italics 406, and underline 408, along with another underline 410. However, in the illustrated example of FIG. 4, the cursor 400 is not located within any of the in-line elements 404, 406, 408, 410 of the current block 402. Therefore, none of the in-line elements 404, 406, 408, 410 are highlighted.

Figure 5:
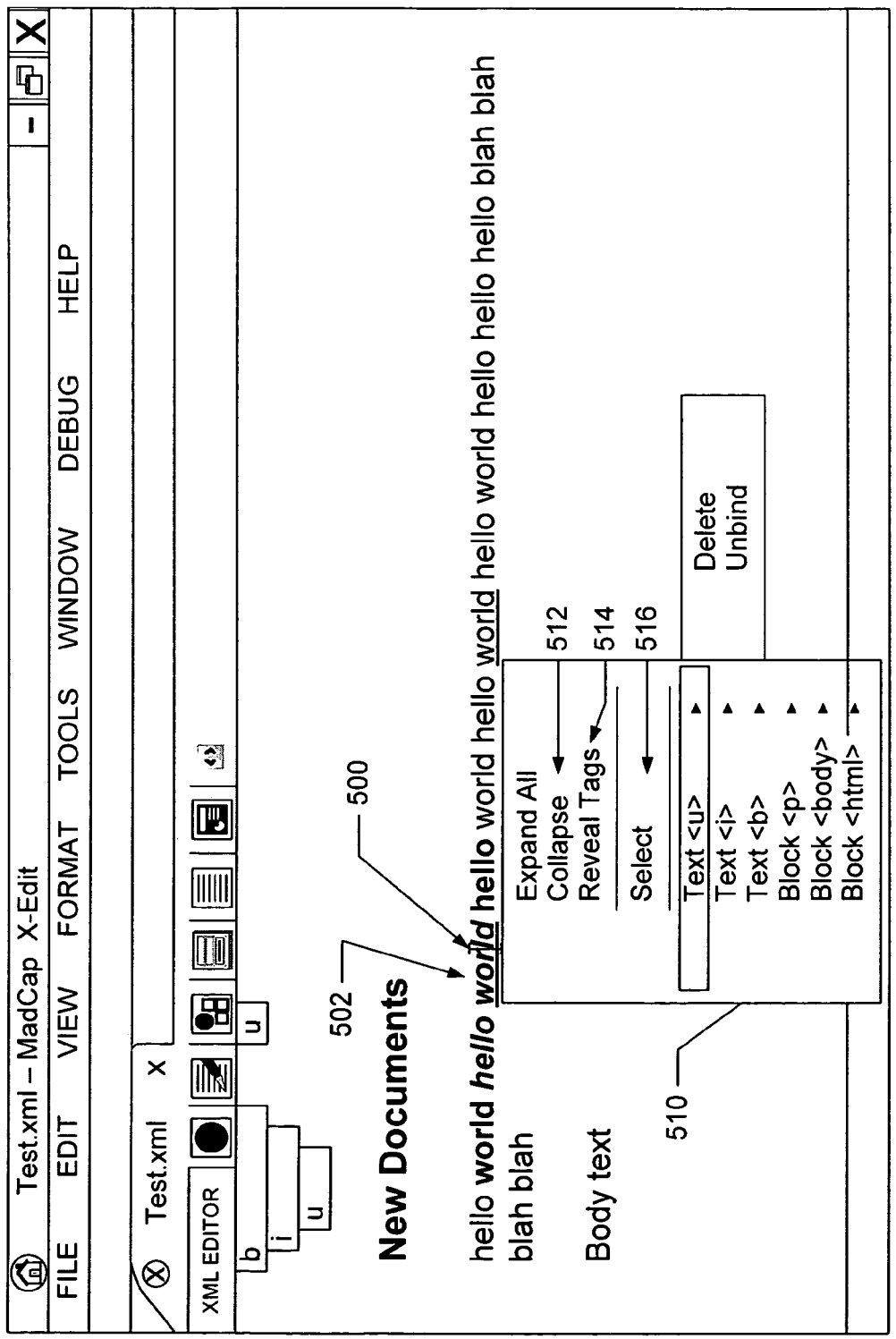
FIG. 5 illustrates another example configuration of the VDSI pane of the document editor displaying a drop-down menu.

In-line elements can be edited or acted upon through interaction with the elements displayed in the upper pane. For example, as depicted in FIG. 5, moving the mouse and performing a single click on the highlighted element 502 causes a drop-down menu 510 to appear. Selecting items from that menu causes the menu to close (e.g., item 512), causes the tags in the active block to be displayed in the WYSIWYG portion of the display (e.g., item 514), or causes the text within inline element to be selected (e.g., item 516). Additionally, note that the lower portion of the drop-down menu 510 displays the tree structure associated with an inline element. Each of those levels or nodes can be deleted or unbound. Unbinding an element releases it from its association with the node directly above it. If any of these actions are taken, the display is immediately redisplayed to show the changes.

Figure 6:
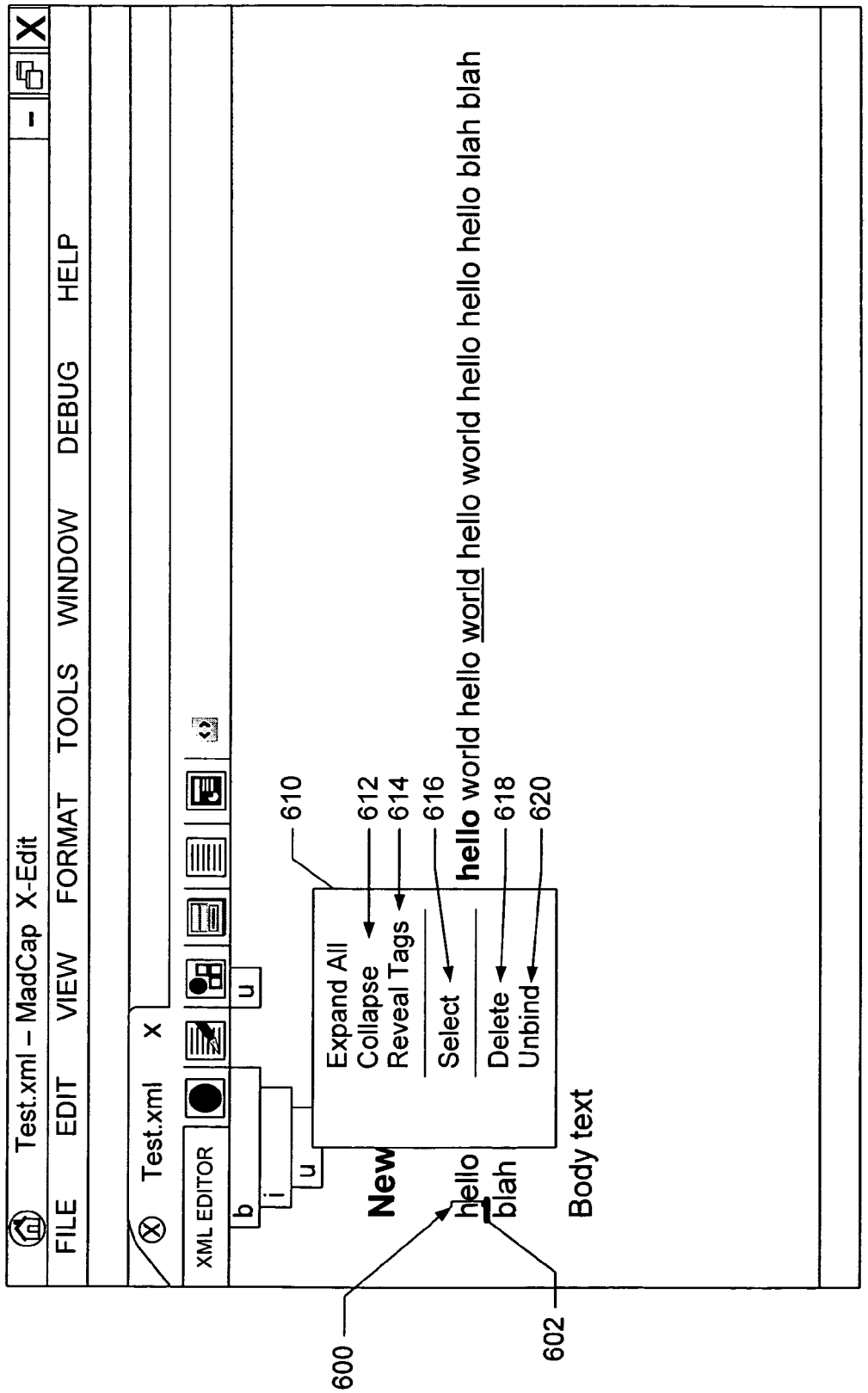
FIG. 6 illustrates another example configuration of a drop-down menu.

FIG. 6 illustrates another example configuration of a drop-down menu. In the illustrated configuration, a marker 602 is shown under the letter 'h' of the word 'hello'. Alternative shapes and configurations can be used for the marker. The marker 602 indicates the approximate position of the beginning tag (e.g., begin bold) of the tag nearest to the position of the cursor 600. For example, if the cursor is located within the section of bolded text, the marker 602 would be displayed under the approximate position of the tag which begins the bolded section.

In the illustrated example of FIG. 6, moving the mouse over the marker 602 or selecting the marker causes a drop-down menu 610 to be opened. The drop-down menu 610 allows for the closing of the menu (e.g., item 612), the revealing of all of the tags in the active block (e.g., item 614), the selection of the section bounded by the tags (e.g., item 616), the deleting of the text bounded by the associated tags (e.g., item 618), and the removal/unbinding of the associated tags (e.g., item 620). The marker 602 also provides a useful visual reference of the beginning point of the tagged section. Note that in FIG. 6 where the cursor resides in a section not associated with any tags, none of the indicators in the upper toolbar are highlighted.

Figure 7:
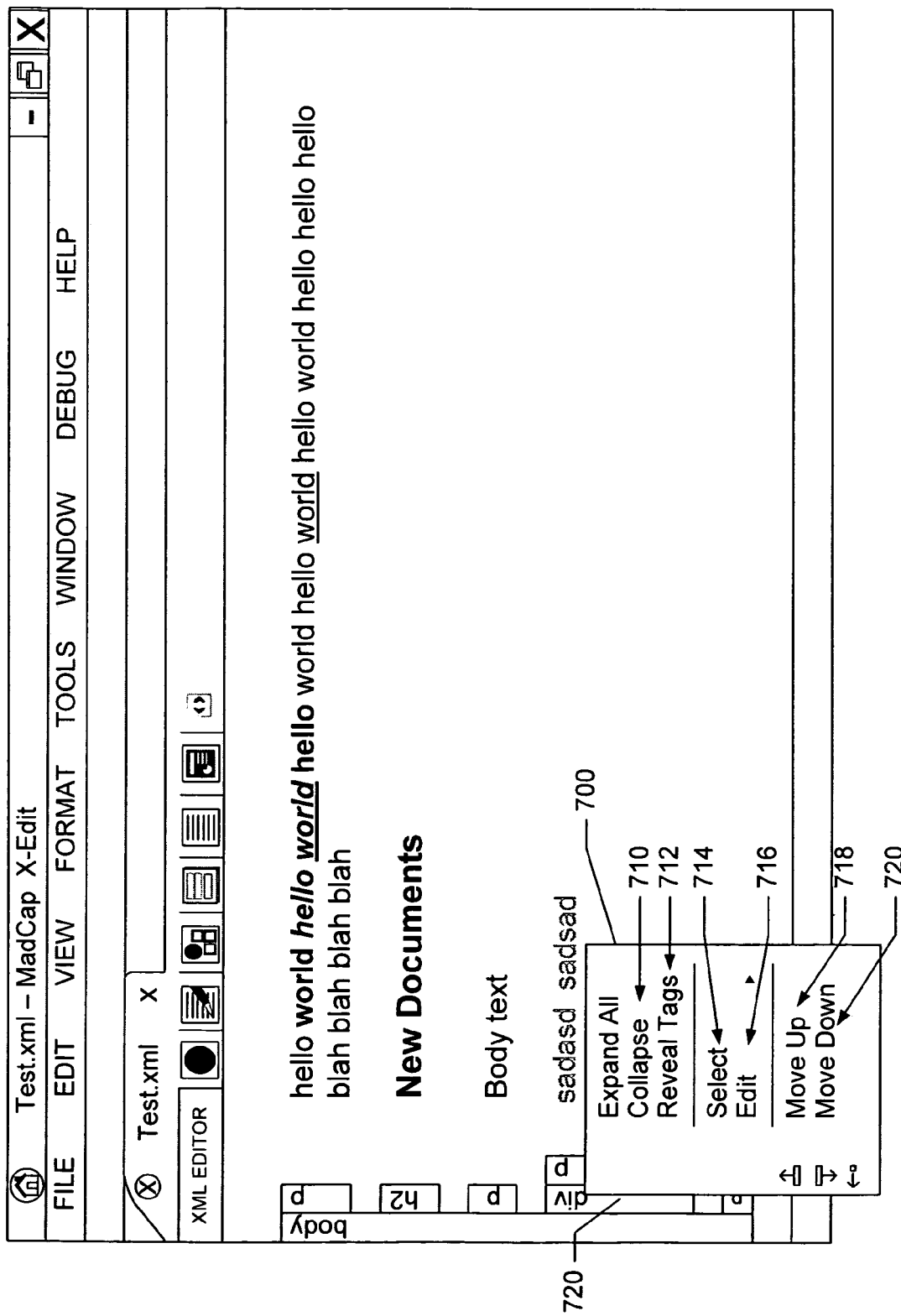
FIG. 7 represents an example of a drop-down menu that appears when one of the elements on the left pane is activated, for example, by clicking with the mouse.

FIG. 7 represents an example of a drop-down menu 700 that appears when one 720 of the elements on the left pane is activated, for example, by clicking with the mouse. The drop-down menu 700 provides an easy way to perform manipulations and editing at the block level. The menu 700 provides for the one click operations of closing the menu (e.g., item 710), revealing/displaying in the WYSIWYG section of the display all of the tags in that block (e.g., item 712), selecting that block (e.g., item 714), editing of the block (e.g., item 716), and moving the block up one position (e.g., item 718) or down one position (e.g., item 720). In an alternative embodiment, the menu 700 provides for moving the block left on position or right one position.

Figure 8:
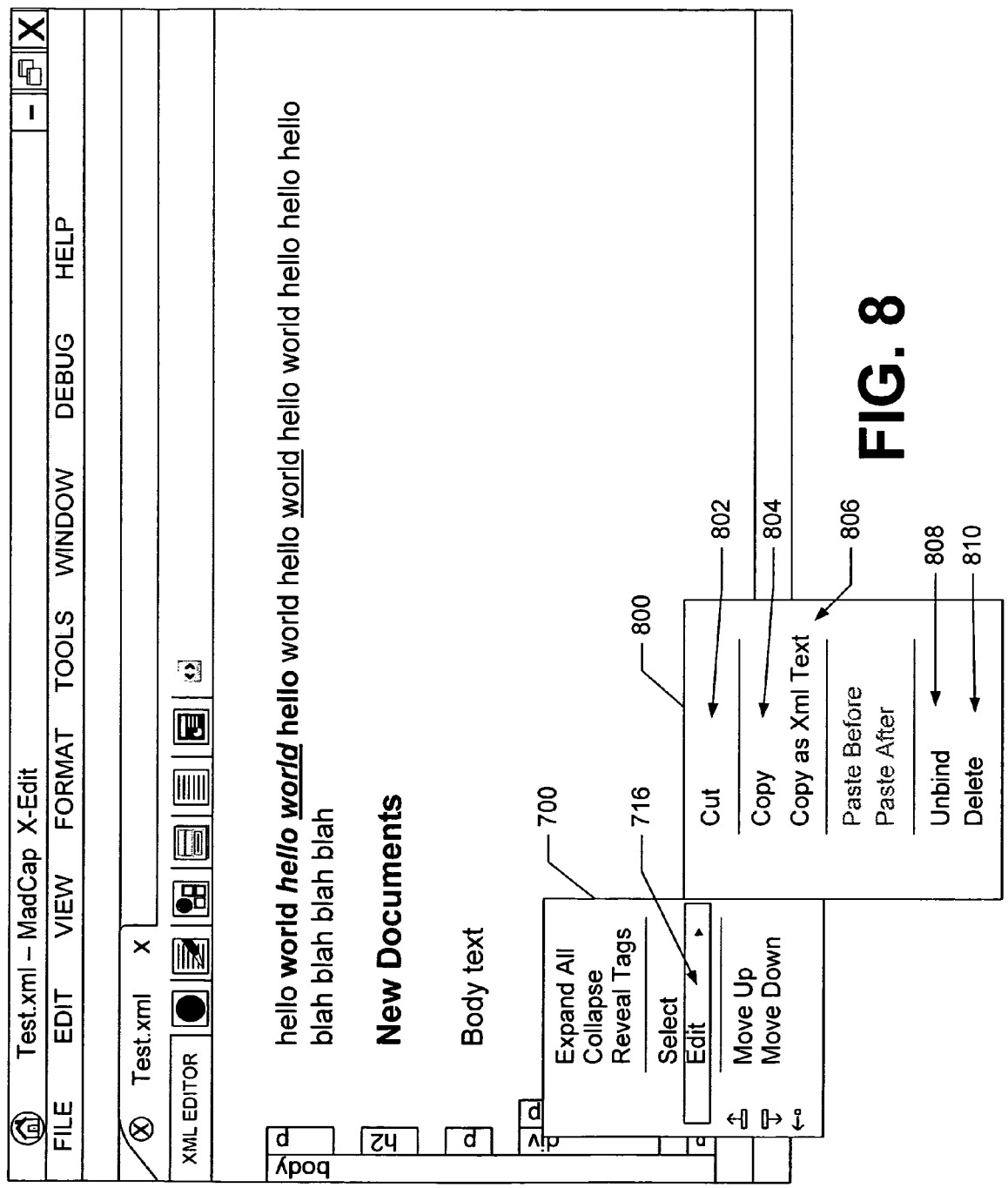
FIG. 8 illustrates an additional drop-down menu that appears when an item is selected from a first drop-down menu.

Referring to FIG. 8, selecting the edit item 716 causes a further drop-down menu 800 to appear. The menu 800 allows for various editing actions such as cutting (e.g., item 802), copying (e.g., items 804, 806), unbinding (e.g., item 808), and deleting of the block (e.g., item 810). The type of items which appear in the drop-down menus vary depending upon the type of block.

Figure 9:
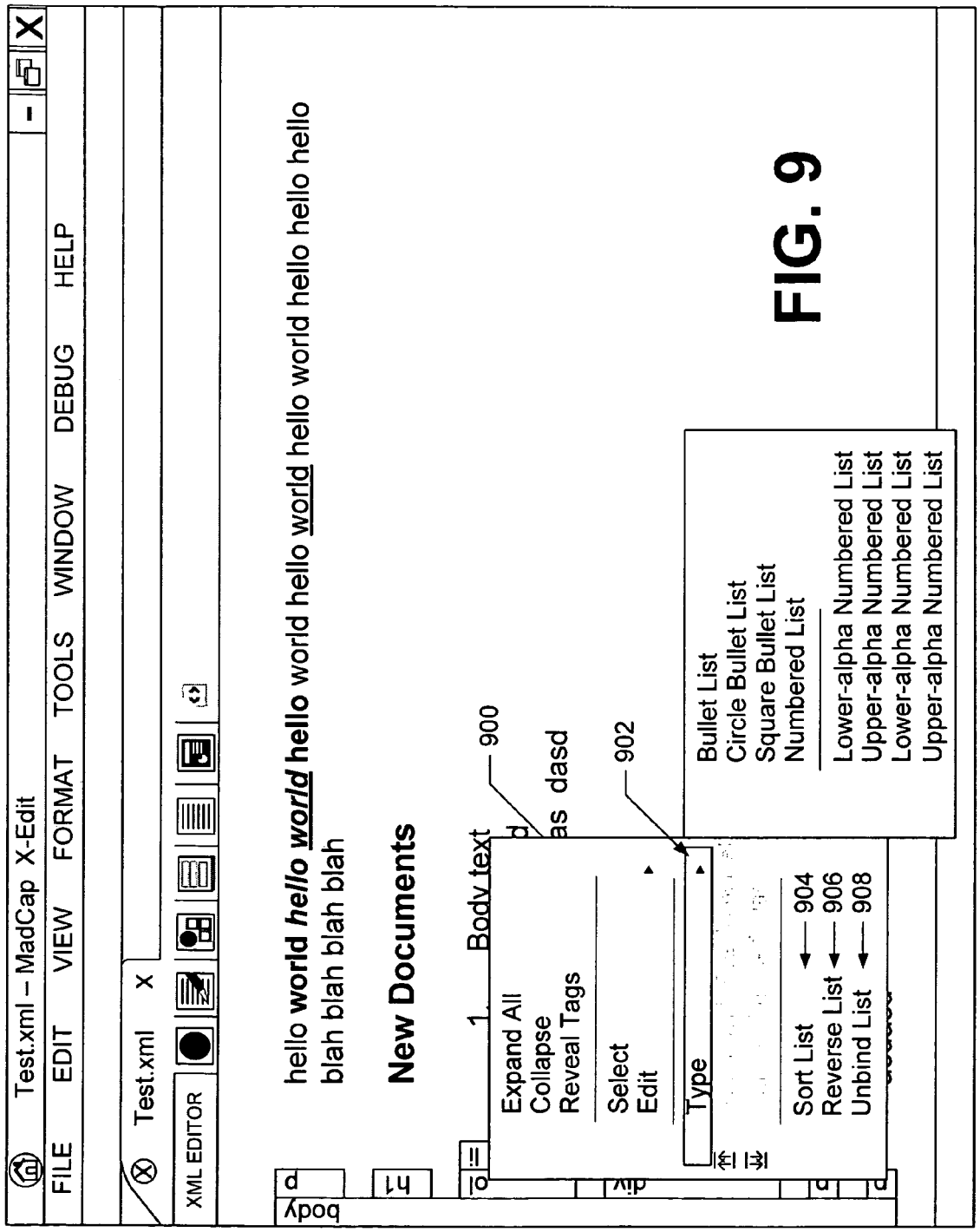
FIG. 9 illustrates an additional drop-down menu that appears when an item associated with a list block is selected from a first drop-down menu.
Figure 10:
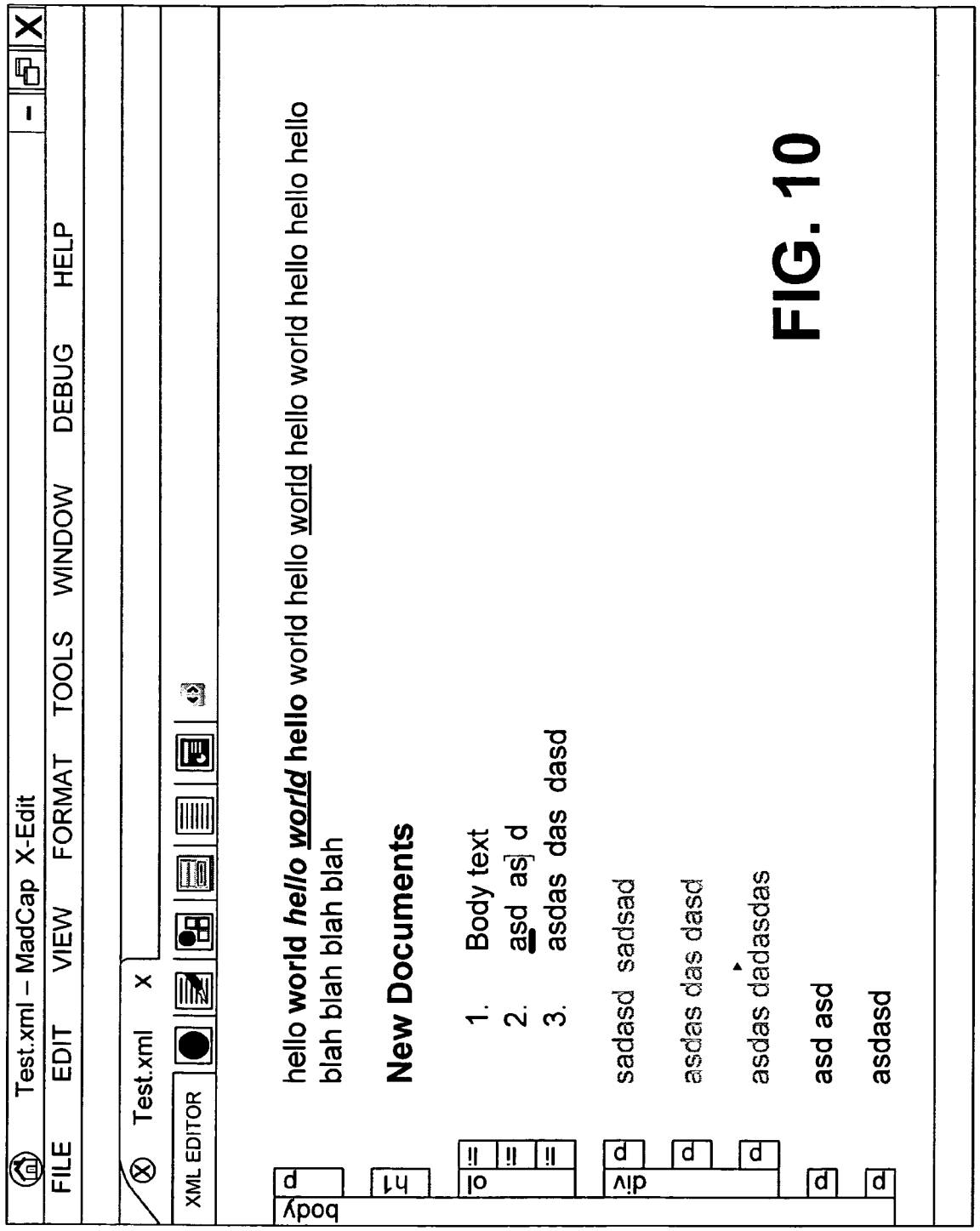
FIG. 10 illustrates the same display shown in FIG. 9 without the drop-down menus.

For example, FIG. 9 shows a drop-down menu 900 associated with a list block (e.g., in XML). This drop-down menu 900 allows for editing operations which have been described before and additionally allows for selecting/changing of the list type (e.g., item 902), sorting (e.g., item 904), reverse sorting (e.g., item 906), and unbinding of the list (e.g., item 908). The sorting can be alphabetical or numerical. Selecting the item type 902 causes a further drop-down menu 910 to open which allows for the selection and change of the type of list. FIG. 10 illustrates the same display shown in FIG. 9 without the drop-down menus 900, 910.

Figure 11:
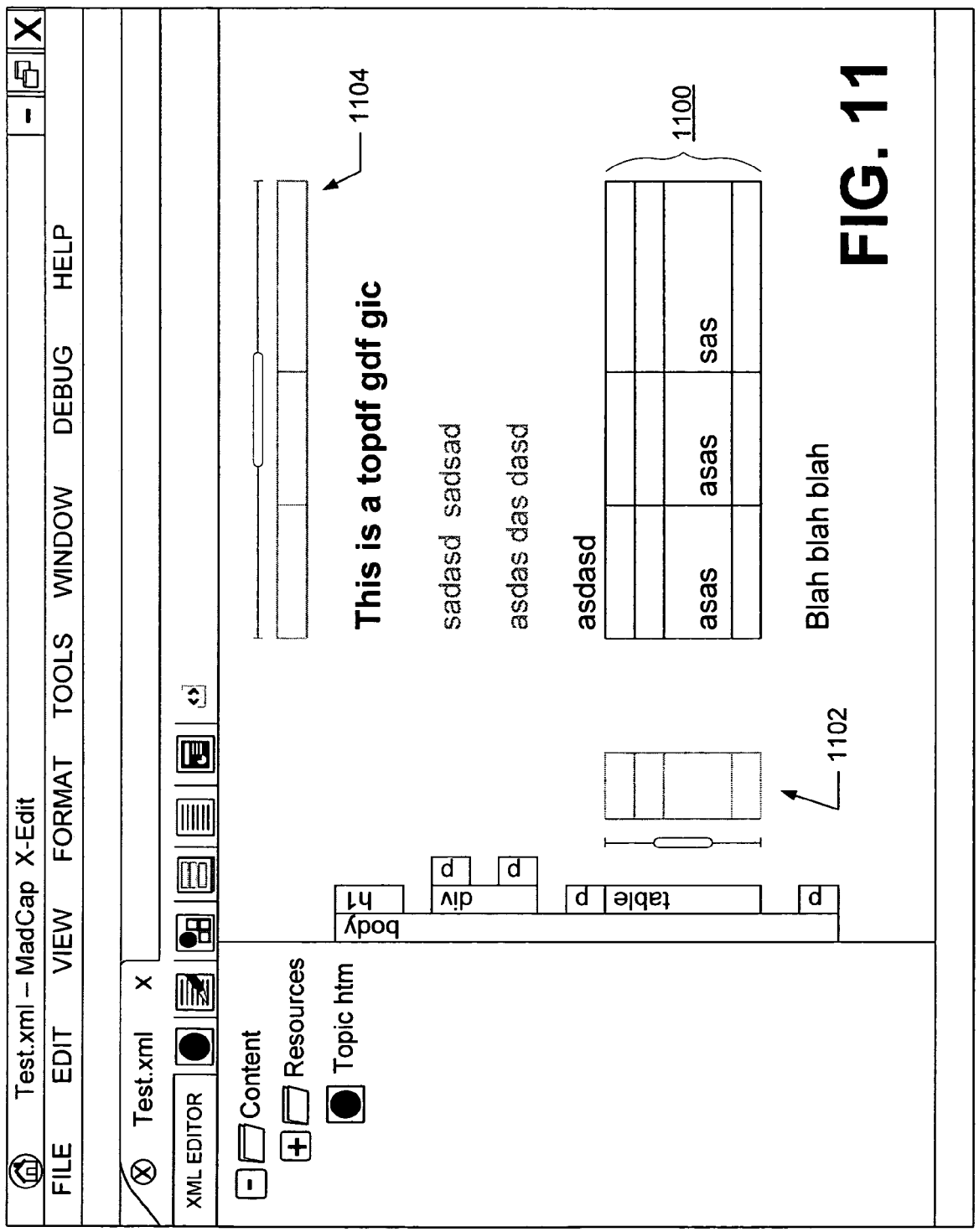
FIG. 11 is an example configuration in which the WYSIWYG portion of the VDSI pane includes a table.

FIG. 11 is an example configuration in which the WYSIWYG portion of the VDSI pane includes a table 1100. When the table 1100 is the active block (e.g., when the cursor is located in the table), additional elements 1102, 1104 are displayed in the left pane and the top pane to provide for easier manipulation and editing of the table 1100. The elements 1102 displayed in the left pane correspond to each of the rows in the table 1100. The elements 1104 displayed in the top pane correspond to the columns in the table 1100. In the illustrated embodiment, the additional elements 1102, 1104 are in proportion to the size of the rows and columns with which they correspond. Rows and columns can be "dropped and dragged" either by highlighting the row(s) or column(s) in the WYSIWYG portion of the display or by highlighting its corresponding element in the top pane or left pane and then dragging it and dropping it. In other embodiments, other types of blocks are manipulated and moved in a similar manner.

Figure 12:
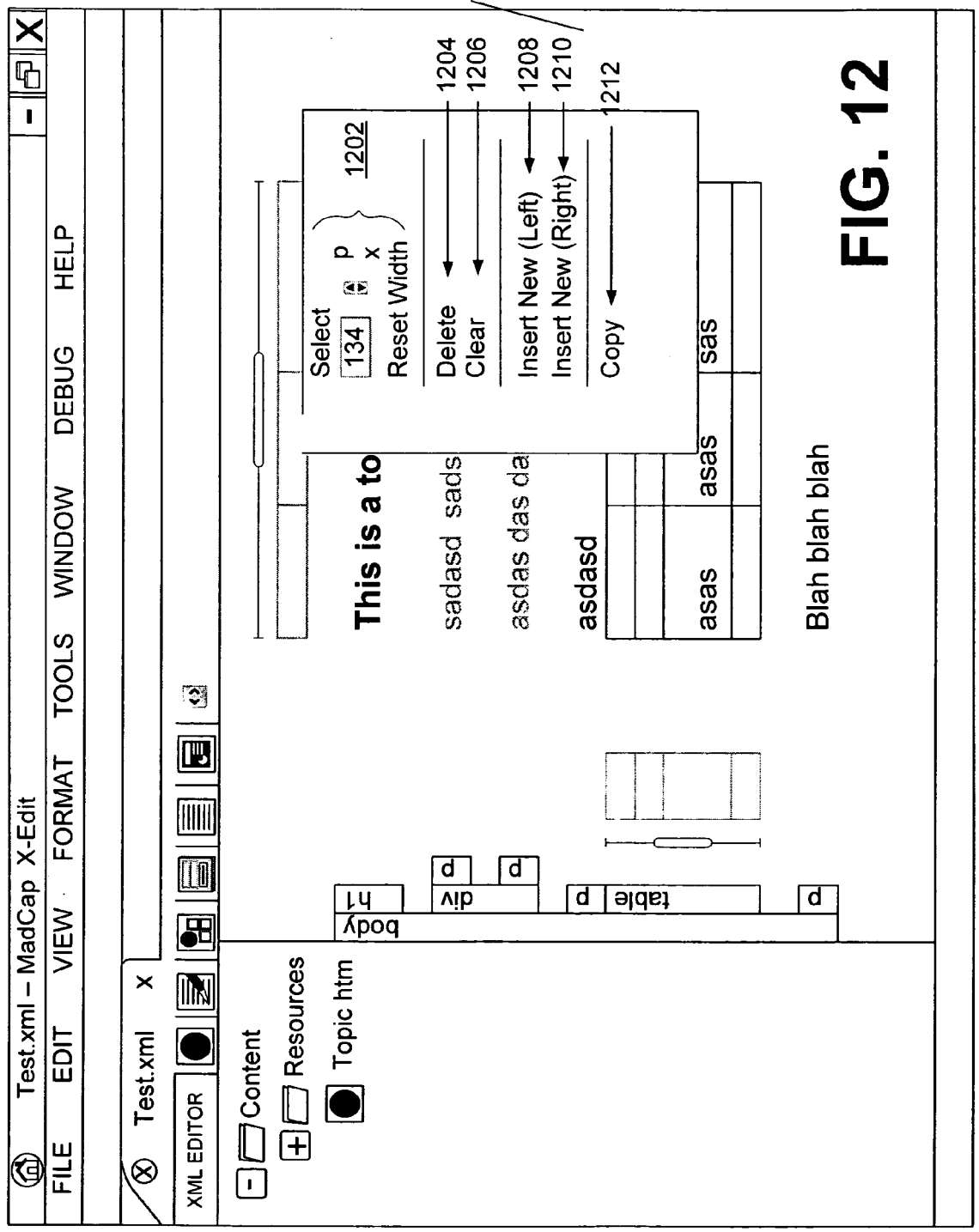
FIG. 12 shows a drop-down menu associated with a column in accordance with one embodiment.

FIG. 12 shows a drop-down menu 1200 associated with a column in accordance with one embodiment. The drop-down menu 1200 allows for the adjustment of the size of the column (e.g., item 1202), allows for deleting the column (e.g., item 1204), clearing the column (e.g., item 1206), inserting columns to the left (e.g., item 1208) and to the right (e.g., item 1210), and copying the column (e.g., item 1212).

Figure 13:
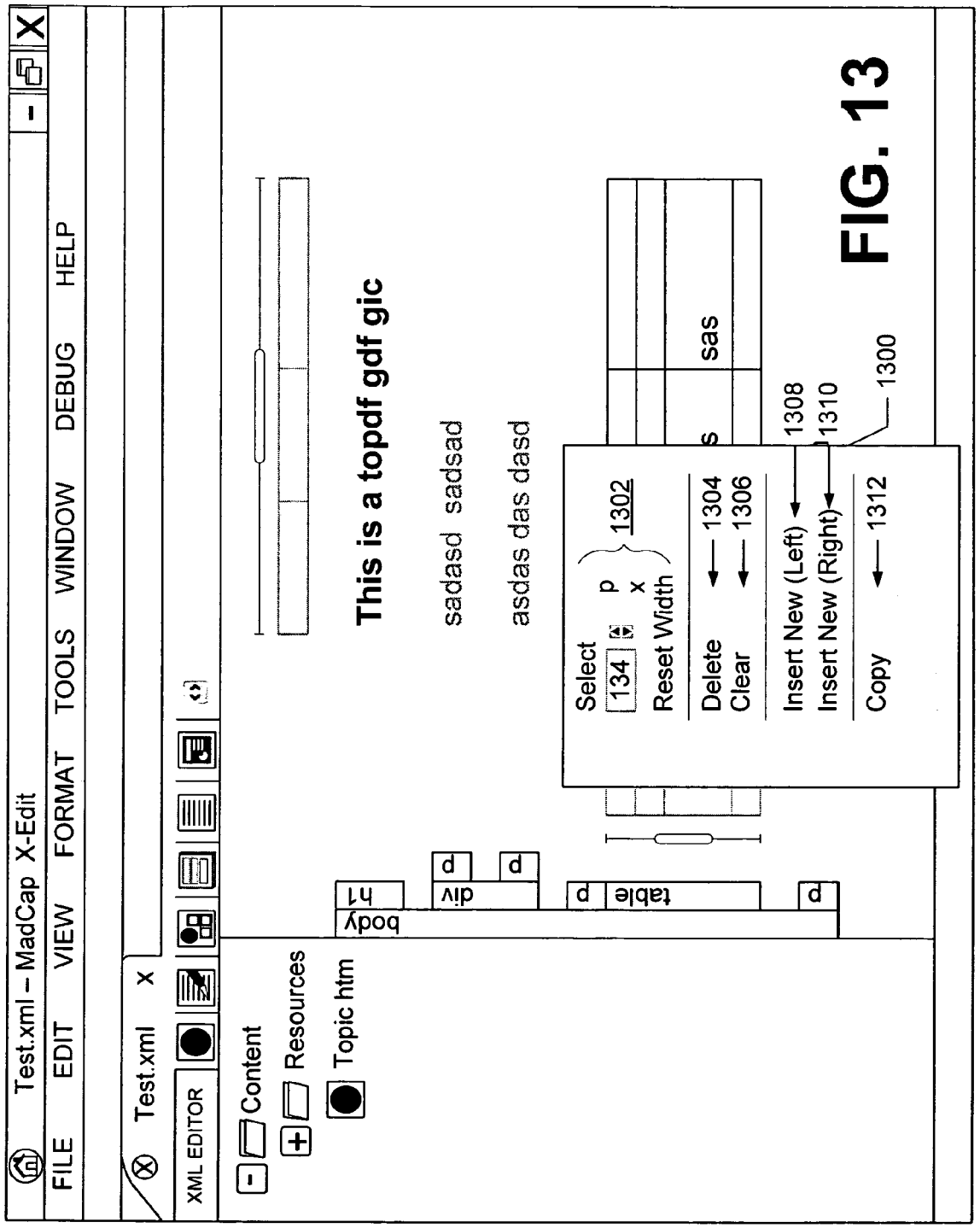
FIG. 13 shows a drop-down menu associated with a row in accordance with another embodiment.

FIG. 13 shows a drop-down menu 1300 associated with a row in accordance with another embodiment. The drop-down menu 1300 allows for the selection of the size of the row (e.g., item 1302), deleting the row (e.g., item 1304), clearing the row (e.g., item 1306), inserting new rows above (e.g., item 1308) and below (e.g., item 1310) the current row, and copying the row (e.g., item 1312).

Figure 14:
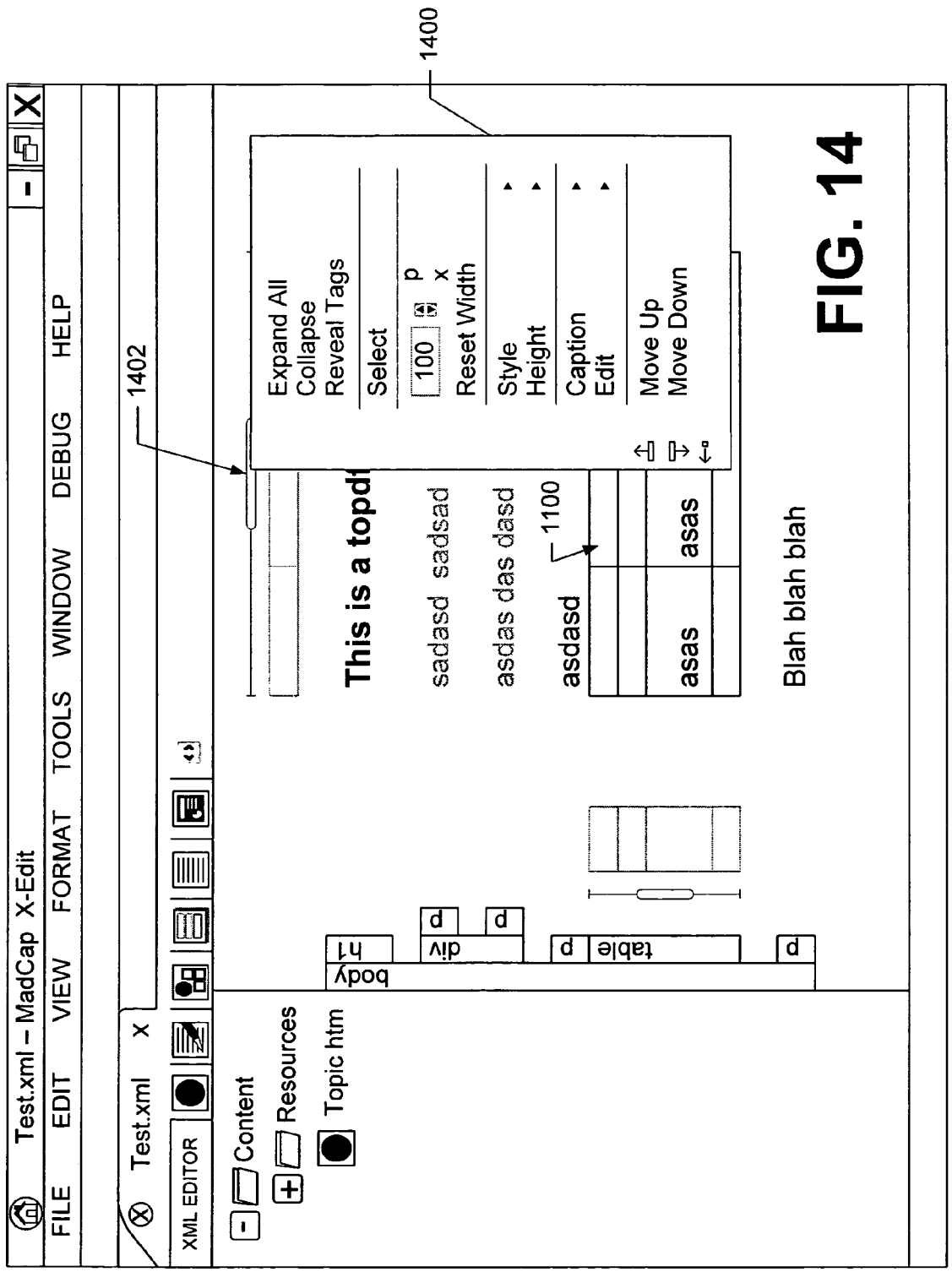
FIG. 14 shows a drop-down menu that is displayed when a top pane is selected.

FIG. 14 shows a drop-down menu 1400 that is displayed when element 1402 in the top pane is selected. The drop-down menu 1400 allows for editing and/or change operations that apply to all of the columns in the table 1100.

Figure 15:
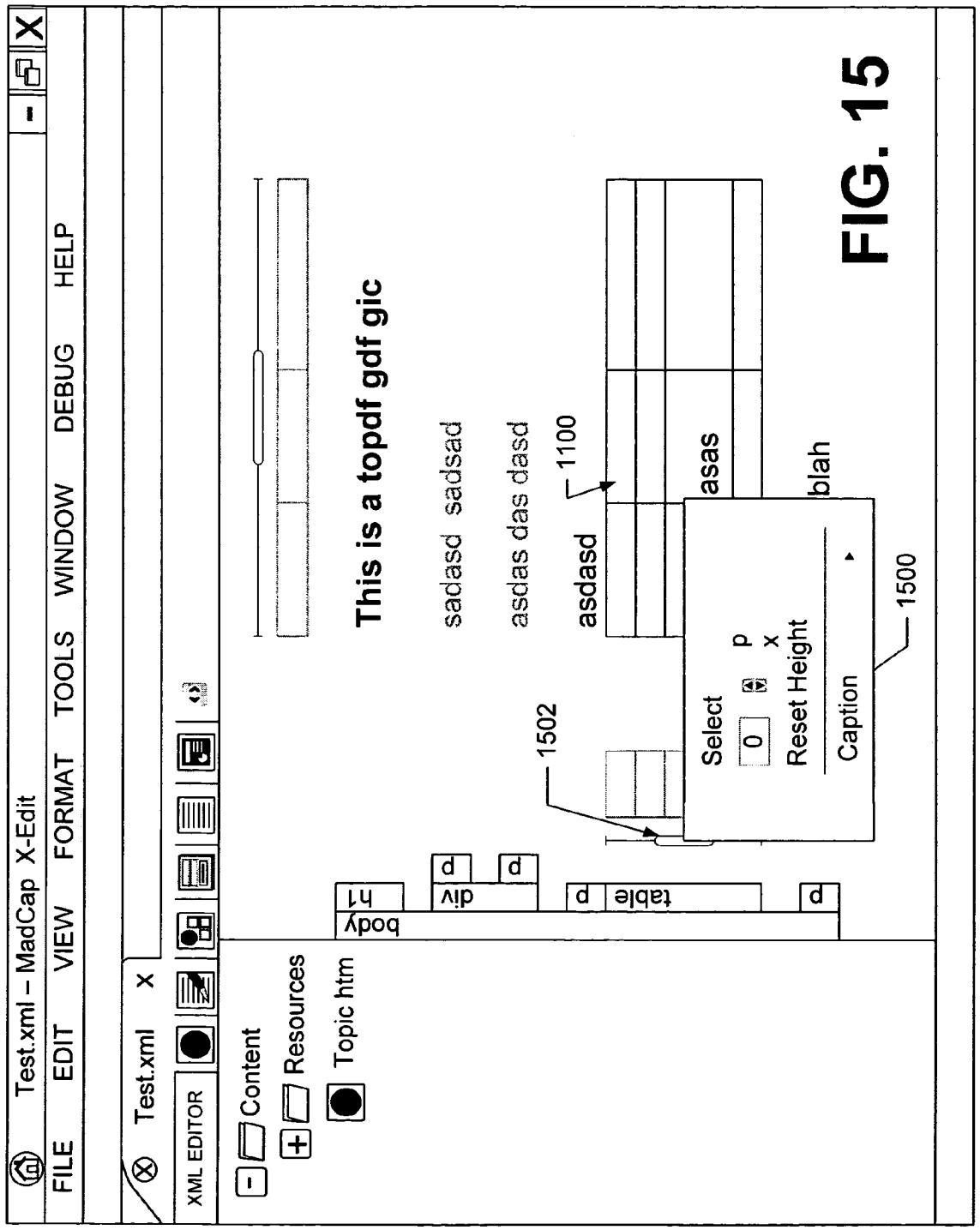
FIG. 15 shows a drop-down menu that is displayed when a left pane is selected.

FIG. 15 shows a drop-down menu 1500 that is displayed when element 1502 in the left pane is selected. The drop-down menu 1500 allows for editing and/or change operations that apply to all of the rows in the table 1100.

Figure 16A:
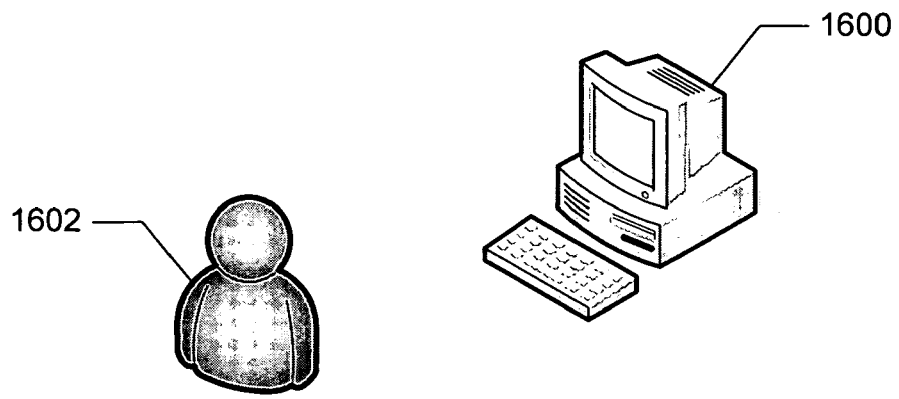
FIG. 16A shows a representation of a computer system and a user.

Various embodiments are realized in electronic hardware, computer software, or combinations of these technologies. FIG. 16A shows one representation of a computer system 1600 and a user 1602. The computer system 1600 is configured to be suitable for practicing the embodiments by providing a data processing unit 1615 that allows the user 1602 to create, edit, and maintain document content in the WYSIWYG environment while providing access to document structure information to the user. In one example, the computer system 1600 provides a data processing unit 1615 that includes the traditional WYSIWYG editor view paired with a Visual Document Structure Indicator (VDSI) pane to allow for both WYSIWYG and structure editing within a single interface.

Figure 16B:
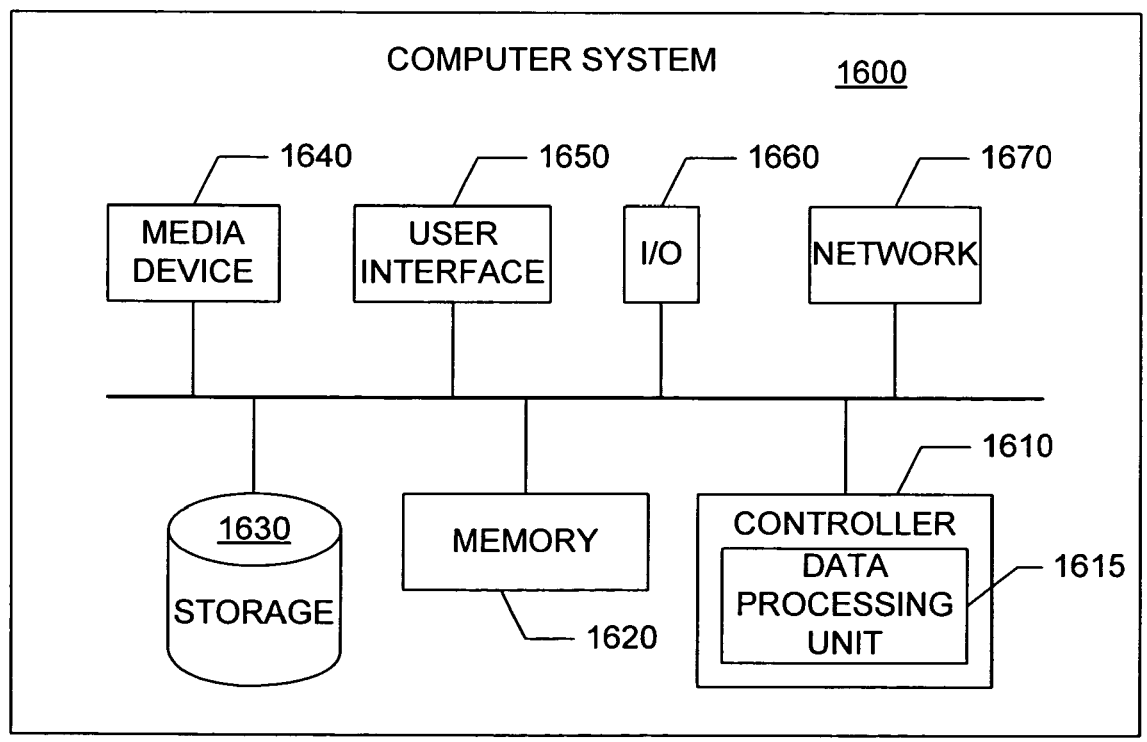
FIG. 16B shows a block diagram of one embodiment of the computer system in FIG. 16A, including an integrated document editor.

FIG. 16B shows a block diagram of one embodiment of the computer system 1600 in FIG. 16A, including the data processing unit 1615. The computer system 1600 includes a controller 1610, a memory 1620, storage 1630, a media device 1640, a user interface 1650, an input/output (I/O) interface 1660, and a network interface 1670. These components are interconnected by a common bus 1680. Alternatively, different connection configurations can be used, such as a star pattern with the controller at the center.

The controller 1610 is a programmable processor and controls the operation of the computer system 1600 and its components. The controller 1610 loads instructions from a computer-readable storage medium such as the memory 1620 or an embedded controller memory (not shown) and executes these instructions to control the system. In its execution, the controller 1610 provides an integrated document editor as a software system. Alternatively, this service can be implemented as separate components in the controller 1610 or the computer system 1600. The data processing unit 1615 includes the traditional WYSIWYG editor view paired with a Visual Document Structure Indicator (VDSI) pane to allow for both WYSIWYG and structure editing within a single interface.

Memory 1620 stores data temporarily for use by the other components of the computer system 1600, such as for storing document structure information. In one embodiment, memory 1620 is implemented as RAM. In one embodiment, memory 1620 also includes long-term or permanent memory, such as flash memory and/or ROM.

Storage 1630 stores data temporarily or long term for use by the other components of the computer system 1600. In one embodiment, storage 1630 is a hard disk drive. Storage 1630 stores information for use by the data processing unit 1615, such as document content or document structure information. Storage 1630 also stores data generated by the data processing unit.

The media device 1640 receives removable media and reads and/or writes data to the inserted media. In one embodiment, the media device 1640 is an optical disc drive.

The user interface 1650 includes components for accepting user input from a user of the computer system 1600 and presenting information to the user. In one embodiment, the user interface 1650 includes a keyboard, a mouse, audio speakers, and a display. The controller 1610 uses input from the user to adjust the operation of the computer system 1600.

The I/O interface 1660 includes one or more I/O ports to connect to corresponding I/O devices, such as external storage or supplemental devices (e.g., a printer or a PDA). In one embodiment, the ports of the I/O interface 1660 include ports such as: USB ports, PCMCIA ports, serial ports, and/or parallel ports. In another embodiment, the I/O interface 1660 includes a wireless interface for communication with external devices wirelessly.

The network interface 1670 includes a wired and/or wireless network connection, such as an RJ-45 or "Wi-Fi" interface (802.11) supporting an Ethernet connection.

The computer system 1600 includes additional hardware and software typical of computer systems (e.g., power, cooling, operating system), though these components are not specifically shown in FIG. 16B for simplicity. In other embodiments, different configurations of the computer system can be used (e.g., different bus or storage configurations or a multi-processor configuration).

The steps of a method or algorithm or the functions of a module, unit or block described in connection with the embodiments disclosed herein can be embodied directly in hardware, in a software module executed by a processor, or in a combination of the two Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, unit or step is for ease of description. Specific functions or steps can be moved from one module, block or unit to another without departing from the invention.

Various illustrative embodiments have been described. However, one of ordinary skill in the art will see that additional embodiments are also possible and within the scope of those embodiments. For example, while the above description refers to the VDSI pane being configured with an upper pane and a left pane, the VDSI pane can be configured in a different configuration, such as configuring the VDSI pane with a combination of upper, lower, left, and right panes. Accordingly, the present invention is not limited to only those embodiments described above.

What is claimed is:

1. A computer for processing a structured document, the computer comprising:
   a user interface configured to receive user input;
   a document data storage configured to receive and store document data from the structured document;
   a data manipulator configured to receive the document data and the user input, said data manipulator operating to manipulate the received document data according to the user input, and to store the manipulated document data in said document data storage; and
   a data display unit configured to receive and process at least one of the user input and the document data, said data display unit operating to display different components of the processed document data in separate areas of a display pane,
   wherein said data display unit includes:
      a content display unit configured to display the content of the document data in a format appropriate for processing the content, said content display unit operating to display the content of the document data in a first area of the display pane; and a structure display unit configured to display the underlying structure of the document data in a graphical format appropriate for processing the underlying structure, wherein the display pane includes a visual document structure indicator pane, the visual document structure indicator pane including a WYSIWYG processing area in the first area of the display pane for processing and displaying the content of the document data; and a structure-based processing area in the second area of the display pane for processing and displaying the underlying structure of the document data, the underlying structure of the document comprising one or more blocks, each block comprising a portion of document content, each block being associated with one or more in-line elements, the structure based processing area including a first sub-pane for graphically displaying formatting information about in-line elements associated with a current block and the current character in the current block of the WYSIWYG processing area where a cursor is located, wherein each character that has formatting information associated with that character has the formatting information displayed in the second area of the display pane; and a second sub-pane for graphically displaying structural information about blocks being displayed in the WYSIWYG area, the structural information comprising information representing how the blocks are organized within the underlying structure of the document, wherein the structural information about the blocks being displayed in the WYSIWYG area is aligned with the corresponding block in the WYSIWYG area.

2. The computer of claim 1, wherein the structured document includes a mark-up language document.

3. The computer of claim 1, wherein the format appropriate for processing the content includes a format for a WYSIWYG environment.

4. The computer of claim 1, further comprising at least one menu configured to process an in-line element of the current block of the WYSIWYG processing area when said in-line element is selected.

5. The computer of claim 1, further comprising at least one menu configured to process an in-line element of the current block of the WYSIWYG processing area when a marker associated with said in-line element is selected.

6. The computer of claim 1, further comprising at least one menu configured to process a selected block of the WYSIWYG processing area when an element of said second sub-pane corresponding to said selected block is selected.

7. The computer of claim 1, wherein said first sub-pane includes a first plurality of elements of a tabulated format corresponding to a table in the WYSIWYG processing area; and said second sub-pane includes a second plurality of elements of a tabulated format corresponding to the table.

8. The computer of claim 7, wherein said first plurality of elements displays formatting information corresponding to columns of a row in the table where the cursor is located.

9. The computer of claim 7, wherein said second plurality of elements displays structural information corresponding to rows in the table.

10. The computer of claim 7, further comprising at least one menu for processing the table.

11. The computer of claim 7, further comprising at least one menu for processing said first and second plurality of elements.

12. A method for processing a structured document, the method comprising:

manipulating and storing document data from the structured document according to user input;

processing the document data to display different components of the processed document data in separate areas of a display pane;

displaying content of the document data in a first area of the display pane, in a format appropriate for processing the content; and displaying an underlying structure of the document data in a second area of the display pane separate from the first area, in a graphical format appropriate for processing the underlying structure, wherein displaying an underlying structure of the document data in a second area includes displaying the underlying structure of the document data in a graphical format appropriate for processing the structure, the underlying structure of the document comprising one or more blocks, each block comprising a portion of document content, each block being associated with one or more in-line elements, and wherein displaying the underlying structure of the document also includes graphically displaying on a first sub-pane formatting information about in-line elements associated with a current block of the content displayed in the first area where a cursor is located; and graphically displaying on a second sub-pane structural information about blocks being displayed in the first area, the structural information comprising information representing how the blocks and inline elements organized within the underlying structure of the document.

13. The method of claim 12, wherein displaying content of the document data in a first area includes displaying the content of the document data in a WYSIWYG format appropriate for processing the content.

14. The method of claim 12, further comprising highlighting a format element of said first sub-pane corresponding to an in-line element in which the cursor is located.

15. The method of claim 12, further comprising providing at least one menu for processing an in-line element of the current block of the first area when said in-line element is selected.

16. The method of claim 12, further comprising providing at least one menu for processing an in-line element of the current block of the first area when a marker associated with said in-line element is selected.

17. The method of claim 12, further comprising providing at least one menu for processing a selected block of the first area when an element of said second sub-pane corresponding to said selected block is selected.

18. The method of claim 12, wherein said first sub-pane includes a first plurality of elements of a tabulated format corresponding to a table in the first area; and said second sub-pane includes a second plurality of elements of a tabulated format corresponding to the table.

19. The method of claim 18, further comprising providing at least one menu for processing the table.

20. The method of claim 18, further comprising providing at least one menu for processing said first and second plurality of elements.

21. A computer program, stored in a computer-readable storage medium, for processing a structured document, the program comprising executable instructions that cause a computer to:
- manipulate and store document data from the structure document according to user input; process the document data to display different components of the processed document data in separate areas of a display pane;
- display content of the document data in a first area of the display pane, in a format appropriate for processing the content; and
- display an underlying structure of the document data in a second area of the display pane separate from the first area, in a graphical format appropriate for processing the underlying structure,
- wherein the instructions to display an underlying structure of the document data in a second area includes instructions to display the underlying structure of the document data in a graphical format appropriate for processing the structure, the underlying structure of the document comprising one or more blocks, each block comprising a portion of document content, each block being associated with one or more in-line elements, and
- wherein the instructions to display the underlying structure of the document also include instructions to
  - graphically display on a first sub-pane formatting information about in-line elements associated with a current block of the content displayed in the first area where a cursor is located; and
  - graphically display on a second sub-pane structural information about blocks being displayed in the first area, the structural information comprising information representing how the blocks and inline elements organized within the underlying structure of the document.

22. An apparatus, comprising:
- means for manipulating and storing document data from the structure document according to user input;
- means for processing the document data to display different components of the processed document data in separate areas of a display pane;
- means for displaying content of the document data in a first area of the display pane, in a format appropriate for processing the content; and
- means for displaying an underlying structure of the document data in a second area of the display pane separate from the first area, in a graphical format appropriate for processing the underlying structure,
- wherein the means for displaying an underlying structure of the document data in a second area includes means for displaying the underlying structure of the document data in a graphical format appropriate for processing the structure, the underlying structure of the document comprising one or more blocks, each block comprising a portion of document content, each block being associated with one or more in-line elements, and
- wherein the means for displaying the underlying structure of the document also includes
  - means for graphically displaying on a first sub-pane formatting information about in-line elements associated with a current block of the content displayed in the first area where a cursor is located; and
  - means for graphically displaying on a second sub-pane structural information about blocks being displayed in the first area, the structural information comprising information representing how the blocks and inline elements organized within the underlying structure of the document.

* * * * *